(12) United States Patent
Peterson et al.

(10) Patent No.: US 10,985,493 B1
(45) Date of Patent: Apr. 20, 2021

(54) ELECTRICAL CONNECTOR

(71) Applicant: R.A. Phillips Industries, Inc., Santa Fe Springs, CA (US)

(72) Inventors: Thomas D. Peterson, Glendora, CA (US); John B. Titcomb, San Dimas, CA (US)

(73) Assignee: R.A. PHILLIPS INDUSTRIES, INC., Santa Fe Springs, CA (US)

( * ) Notice: Subject to any disclaimer, the term of this patent is extended or adjusted under 35 U.S.C. 154(b) by 20 days.

(21) Appl. No.: 16/593,894

(22) Filed: Oct. 4, 2019

(51) Int. Cl.
| | |
|---|---|
| *H01R 13/52* | (2006.01) |
| *B60D 1/64* | (2006.01) |
| *H01B 17/58* | (2006.01) |
| *H01R 13/64* | (2006.01) |
| *H02G 3/02* | (2006.01) |
| *H01R 13/62* | (2006.01) |
| *H01R 9/11* | (2006.01) |
| *H01R 24/20* | (2011.01) |
| *H01R 24/28* | (2011.01) |
| *H01R 13/73* | (2006.01) |
| *H01R 9/03* | (2006.01) |
| *H01R 9/24* | (2006.01) |

(52) U.S. Cl.
CPC ........... *H01R 13/52* (2013.01); *B60D 1/64* (2013.01); *H01B 17/58* (2013.01); *H01R 9/11* (2013.01); *H01R 13/5219* (2013.01); *H01R 13/62* (2013.01); *H01R 13/64* (2013.01); *H01R 24/20* (2013.01); *H01R 24/28* (2013.01); *H02G 3/02* (2013.01); *H01R 9/03* (2013.01); *H01R 9/2491* (2013.01); *H01R 13/5202* (2013.01); *H01R 13/73* (2013.01)

(58) Field of Classification Search
CPC ..................................................... H01R 12/52
See application file for complete search history.

(56) References Cited

U.S. PATENT DOCUMENTS

| | | | | |
|---|---|---|---|---|
| 6,168,447 B1 * | 1/2001 | Stepniak | ............... | H01R 13/53 |
| | | | | 439/187 |
| 6,368,130 B1 * | 4/2002 | Fukuda | .................. | H01R 13/52 |
| | | | | 439/271 |
| 6,483,200 B1 * | 11/2002 | Jacobs | ..................... | B60D 1/62 |
| | | | | 307/10.1 |

(Continued)

FOREIGN PATENT DOCUMENTS

| | | |
|---|---|---|
| DE | 1640 686 A1 | 2/1971 |
| NL | 6805551 A | 10/1968 |

OTHER PUBLICATIONS

Extended European Search Report issued in correspondence EP Application No. 20200066.7, dated Feb. 21, 2021, 10 pages.

*Primary Examiner* — James Harvey
(74) *Attorney, Agent, or Firm* — Lewis Roca Rothgerber Christie LLP

(57) ABSTRACT

A connector configured to be connected to an electrical cable includes a sleeve configured to extend around an end of the electrical cable and a flange extending outward from the sleeve. The flange includes an outer surface and an inner surface. The flange also includes an outer skirt extending continuously and completely around an outer periphery of the base plate, and an inner skirt spaced apart from the outer skirt. The inner skirt traces a closed and continuous path around the sleeve. The flange also includes a channel defined between the inner and outer skirts.

19 Claims, 7 Drawing Sheets

(56) References Cited

U.S. PATENT DOCUMENTS

| | | | | |
|---|---|---|---|---|
| 7,186,137 | B2* | 3/2007 | Rock | 439/502 |
| D647,059 | S* | 10/2011 | Guo | D13/156 |
| D647,060 | S* | 10/2011 | Guo | D13/156 |
| D647,061 | S* | 10/2011 | Guo | D13/156 |
| 9,496,639 | B2* | 11/2016 | Harmon | H01R 24/66 |
| 2002/0106931 | A1* | 8/2002 | Hsien-Te | H01R 13/622 |
| | | | | 439/490 |
| 2017/0149186 | A1* | 5/2017 | Vishwanath | H01R 13/5841 |
| 2017/0373447 | A1* | 12/2017 | Schreiber | H01R 13/631 |
| 2018/0019532 | A1* | 1/2018 | Uenosono | H01R 13/4223 |

\* cited by examiner

ELECTRICAL CONNECTOR

FIELD

The present disclosure relates generally to electrical connectors.

BACKGROUND

Electrical connectors are utilized in a variety of applications to connect two or more electrical components together. For instance, electrical connectors are utilized to create an electrical connection between a trailer and a tractor (e.g., electrical connectors are utilized to create an electrical connection between a sleeper compartment of the tractor or a standard cab of the tractor and the trailer). However, conventional electrical connectors are prone to infiltration by water or contaminants, which tend to corrode and degrade the electrical system, leading to premature failure and/or costly and time-consuming downtime and repairs.

SUMMARY

The present disclosure is directed to various embodiments of an electrical connector configured to be connected to an electrical cable. In one embodiment, the electrical connector includes a sleeve configured to extend around an end of the electrical cable and a flange extending outward from the sleeve. The flange includes an outer surface and an inner surface. The flange also includes an outer skirt extending continuously and completely around an outer periphery of the base plate, and an inner skirt spaced apart from the outer skirt. The inner skirt traces a closed and continuous path around the sleeve. The flange also includes a channel defined between the inner and outer skirts.

The outer skirt may have a first height and the inner skirt may have a second height less than the first height.

The flange may be slanted relative to a longitudinal axis of the sleeve.

The connector may be a male connector including a series of pins or a female connector including a series of sockets.

The inner and outer skirts may be substantially perpendicular to the inner surface of the base plate.

The inner skirt may have a generally square cross-sectional shape.

The outer skirt may include a tapered surface facing the second skirt.

The sleeve and the flange may be monolithic.

The present disclosure is directed to various embodiments of an electrical cable assembly. In one embodiment, the electrical cable assembly includes an electrical cable and a first connector connected to a first end of the electrical cable. The first connector includes a sleeve extending around the second end of the electrical cable, a series of pins extending from an end of the sleeve, and a flange extending outward from the sleeve. The flange includes a base plate having an outer surface and an inner surface, an outer skirt extending continuously and completely around an outer periphery of the base plate, an inner skirt on the base plate spaced apart from the outer skirt, and a channel defined between the inner and outer skirts. The inner skirt traces a closed and continuous path. The electrical cable assembly also includes a second connector configured to mate with the first connector. The second connector includes a receptacle including a series of sockets and a flange extending outward from the receptacle. The flange of the second connector includes a base plate having an inner surface and an outer surface, and a lip extending around a periphery of the base plate.

A height of the lip of the second connector may be substantially equal to a height of the inner skirt of the first connector.

A height of the outer skirt may be greater than the height of the inner skirt.

When the first and second connectors are connected together, the lip of the second connector may extend into the channel in the first connector between the inner and outer skirts.

When the first and second connectors are connected together, a free end of the lip of the second connector may contact the inner surface of the base plate of the first connector.

When the first and second connectors are connected together, a free end of the inner skirt of the first connector may contact the inner surface of the base plate of the second connector.

When the first and second connectors are connected together, the outer skirt of the first connector may overlap at least a portion of the lip of the second connector.

When the first and second connectors are connected together, a free end of the outer skirt of the first connector may be aligned with the outer surface of the base plate of the second connector.

When the first and second connectors are connected together, an outwardly-facing surface of the inner skirt of the first connector may contact an inwardly-facing surface of the lip of the second connector.

The base plates of the first and second connectors may include at least one pair of aligned openings configured to receive a fastener drawing the base plates together.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various embodiments of an electrical connector configured to be connected to an electrical cable. The electrical connector according to various embodiments of the present disclosure is configured to protect the electrical cable against the intrusion of debris and contaminants, or at least mitigate the risk of contaminant intrusion, which might otherwise corrode or degrade the electrical system.

The electrical cables and connectors of the present disclosure may be used to electrically couple any suitable electronic devices together, such as a tractor to a trailer (e.g., a sleeper compartment of the tractor or a standard cab of the tractor to the trailer). Suitable connection schemes for connecting a tractor to a trailer are described in U.S. Pat. No. 6,483,200, the entire content of which is incorporated herein by reference.

Figure 1:
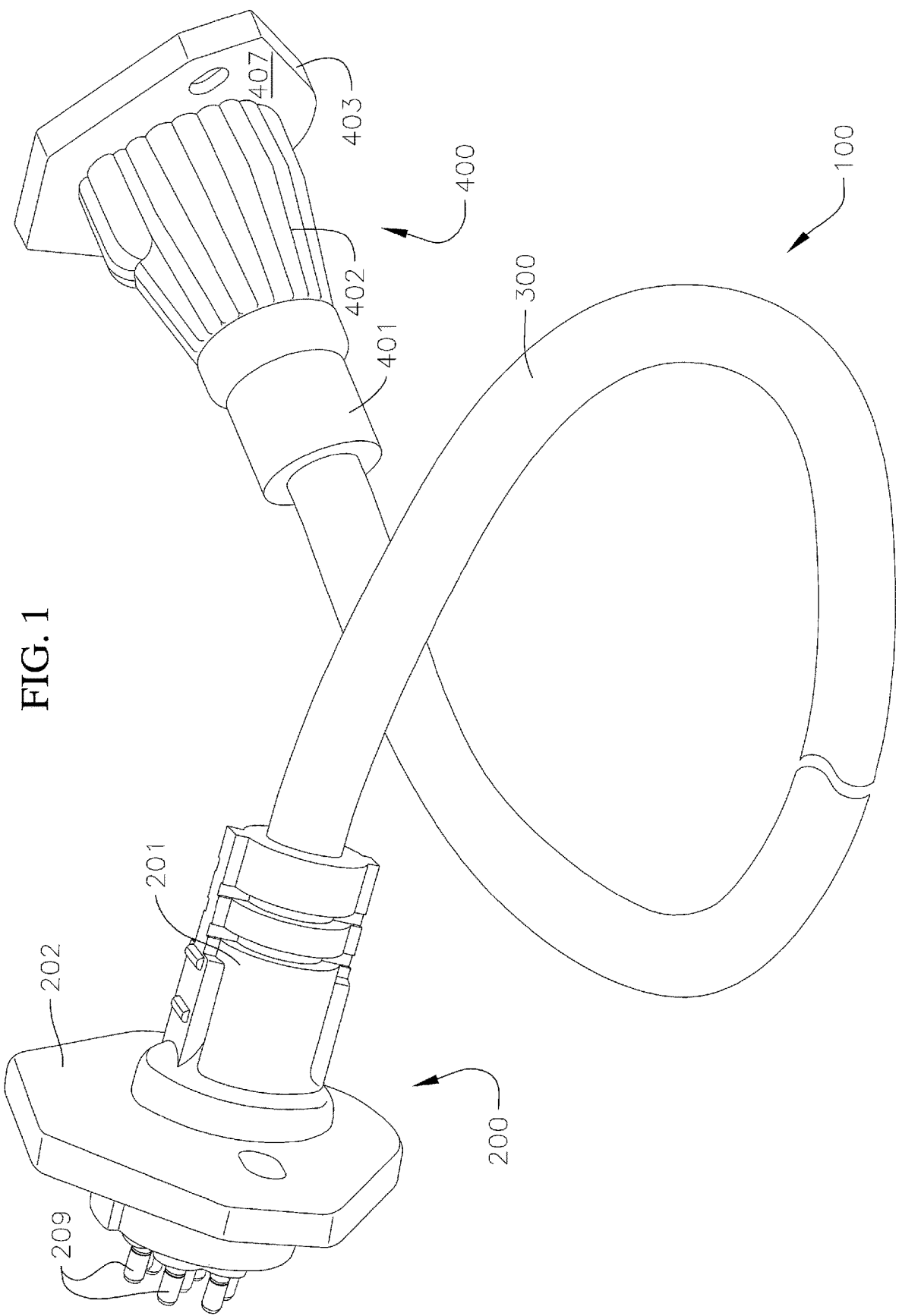
FIG. 1 is a perspective view of an electrical cable assembly including a male connector and a female connector according to one embodiment of the present disclosure.

With reference now to FIG. 1, an electrical cable module or assembly 100 according to one embodiment of the present disclosure includes a male connector 200 (e.g., a plug) connected to one end of an electrical cable 300 (e.g., a multi-conductor cable) and a female connector 400 (e.g., a receptacle) connected to an opposite end of the electrical cable 300. The male connector 200 is configured to mate with the female connector 400 of another electrical cable assembly or an outlet (e.g., an outlet in trailer or in the sleeper box of the tractor), and female connector 400 is configured to mate with the male connector 200 of another electrical cable assembly or an outlet (e.g., an outlet in trailer or in the sleeper box of the tractor). When the male connector 200 of the cable assembly 100 is connected to the female connector 400 of another cable assembly or the female connector 400 of an outlet connected to a first electronic device (e.g., a sleeper box or a cab of a tractor) and the female connector 400 of the cable assembly 100 is connected to the male connector 200 of another cable assembly or the male connector 200 of an outlet connected to a second electronic device (e.g., a trailer), an electrical connection is established such that electrical current may flow between the two electronic devices (e.g., between the tractor and the trailer) through the cable assembly 100. Additionally, as described below in more detail, the configuration of the male and female connectors 200, 400 is configured to prevent or mitigate against the intrusion of debris and contaminants into the electrical system when the male and female connectors 200, 400 are mated together. Otherwise, the presence of debris and/or contaminants may corrode or degrade the electrical system (e.g., the multi-conductor cable 300 and/or pins and sockets of the male and female connectors 200, 400).

In one embodiment, the male and female connectors 200, 400 of the present disclosure may conform to Society of Automotive Engineers (SAE) Standard J560. In one embodiment, the male and female connectors 200, 400 of the present disclosure may conform to International Standards Organization (ISO) Standard 3731. In one or more embodiments, the male and female connectors 200, 400 may conform or comply with any other suitable industry standards.

Figure 2:
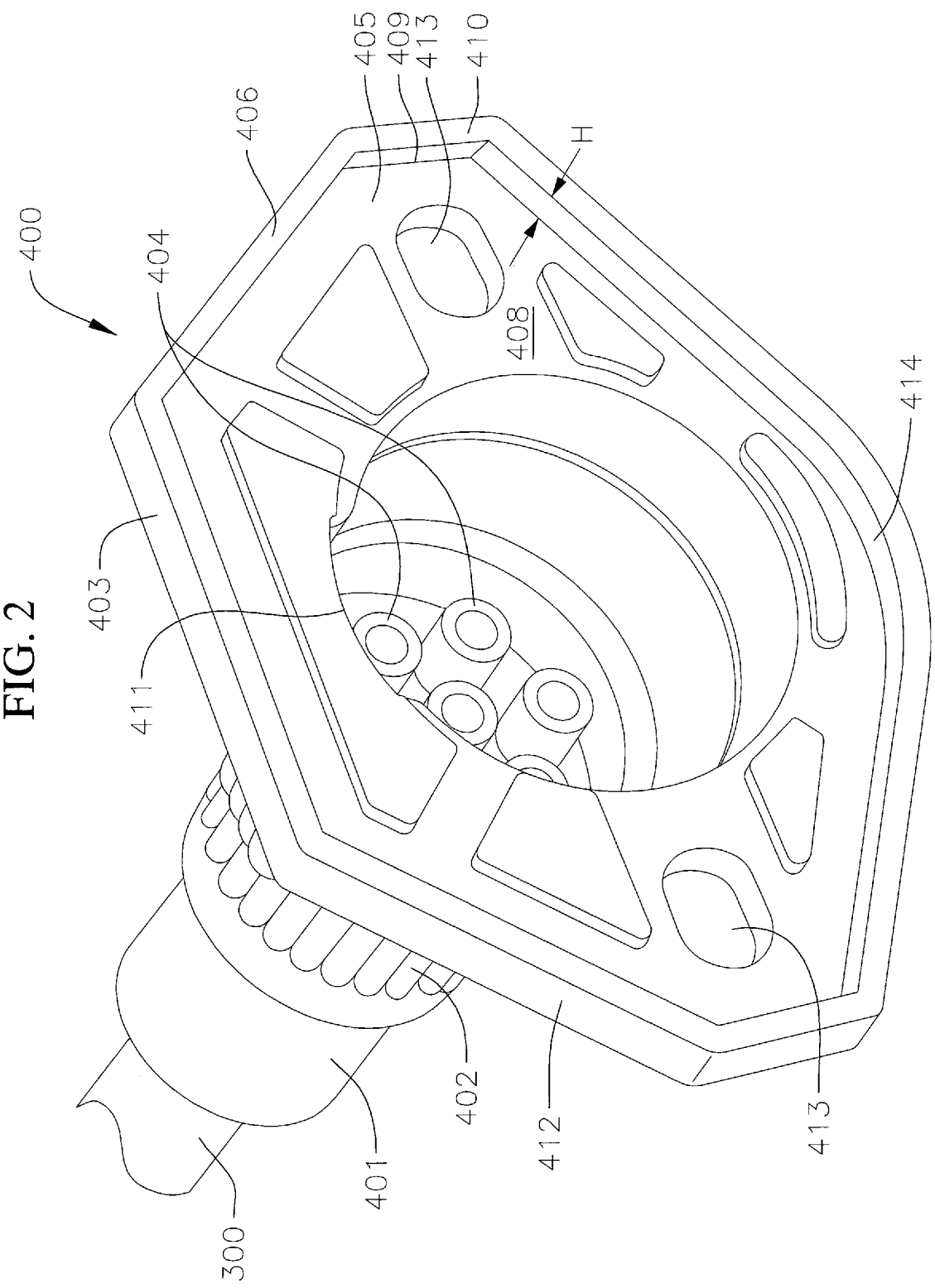
FIG. 2 is a perspective view of the embodiment of the female connector illustrated in FIG. 1.

With reference now to the embodiment illustrated in FIG. 2, the female connector 400 includes a sleeve 401 configured to be connected to the end of the electrical cable 300 (e.g., a multi-conductor cable), a receptacle 402 connected to the sleeve 401, and a flange 403 extending outward from the receptacle 402. In the illustrated embodiment, the receptacle 402 includes a series of sockets 404 configured to be electrically connected to the electrical cable 300. Additionally, in the illustrated embodiment, the flange 403 of the female connector 400 includes a base plate 405 and a lip 406 extending continuously and completely around an outer periphery of the base plate 405. In the illustrated embodiment, the base plate 405 includes an outer surface 407 (see FIG. 1) facing toward the sockets 404 in the receptacle 402 (e.g., an outer surface 407 facing away from the male connector 200 when the male and female connectors 200, 400 are coupled together) and an inner surface 408 opposite the outer surface 407 facing away from the sockets 404 in the receptacle 402 (e.g., an inner surface 408 facing toward the male connector 200 when the male and female connectors 200, 400 are connected together). In the illustrated embodiment, the inner surface 408 of the base plate 405 is configured to interface with the male connector 200. Additionally, in the illustrated embodiment, the lip 406 has a connected end 409 at the inner surface 408 of the base plate 405 and a free end 410 opposite the connected end 409 and distal to the base plate 405. In the illustrated embodiment, the lip 406 extend from the inner surface 408 of the base plate 405 in a direction away from the base plate 405 and the sockets 404 of the female connector 400 (e.g., the lip 406 extends in a direction toward the male connector 200 when the male and female connectors 200, 400 are connected together). Additionally, in the illustrated embodiment, the lip 406 has a height H measured from the free end 410 to the connected end 409 (e.g., a height H measured from the free end 410 of the lip 406 to the inner surface 408 of the base plate 405).

With continued reference to the embodiment illustrated in FIG. 2, the receptacle 402 also includes a keyway 411 configured to ensure proper orientation of the female connector 400 relative to the male connector 200 for mating the male and female connectors 200, 400 together. In the illustrated embodiment, the keyway 411 is an arcuate notch extending circumferentially around a portion of the receptacle 402. In one or more embodiments, the keyway 411 may have any other suitable shape, such as, for instance, a flat segment.

Figure 3A:
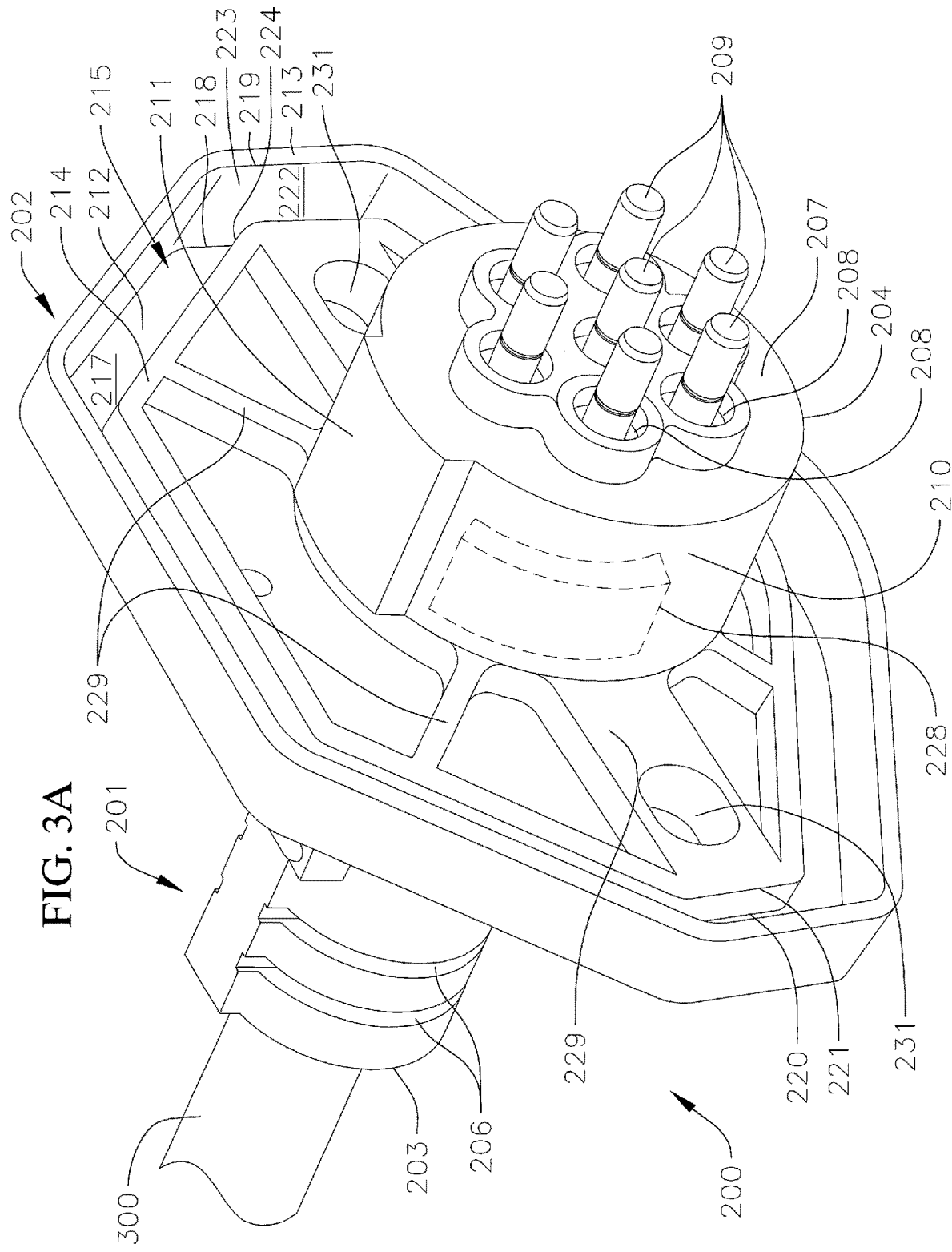
FIGS. 3A-3B are a perspective view and a cross-sectional view, respectively, of the embodiment of the male connector illustrated in FIG. 1 including a sleeve and a flange.
Figure 3B:
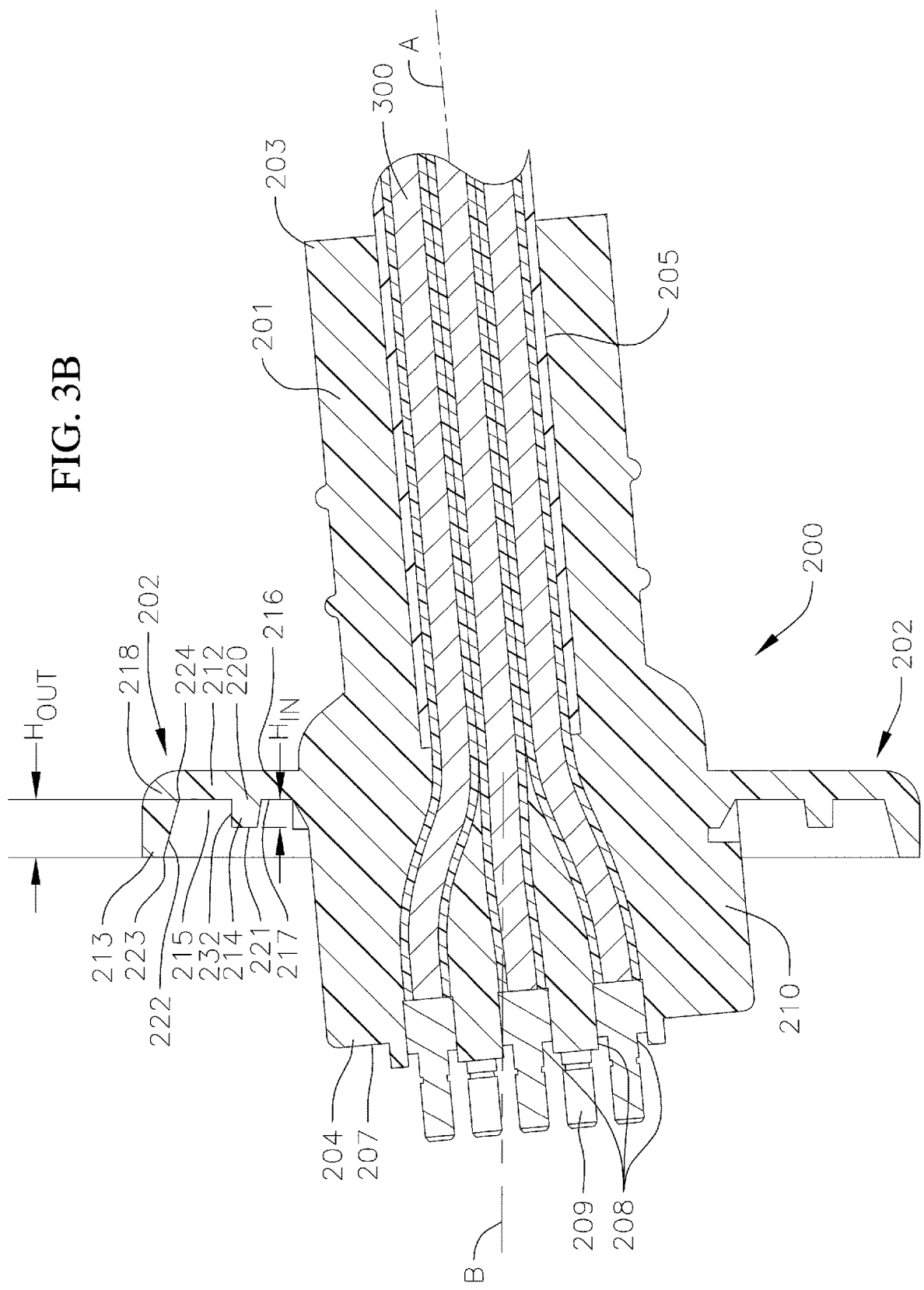

With reference now to the embodiment illustrated in FIGS. 3A-3B, the male connector 200 includes a sleeve 201 configured to be connected to the end of the electrical cable 300 (e.g., a multi-conductor cable) and a flange 202 extending outward from the sleeve 201. In the illustrated embodiment, the sleeve 201 is a hollow, generally cylindrical member (e.g., a tubular member) including a proximal end portion 203 and a distal end portion 204 opposite the proximal end portion 203. The sleeve 201 defines an opening 205 extending longitudinally along the length of the sleeve 201 configured to accommodate a portion of the electrical cable 300. In the illustrated embodiment, the proximal end portion 203 of the sleeve 201 includes a strain relief 206 (e.g., a series of arcuate notches forming the strain relief 206). The sleeve 201 also includes a cap 207 at the distal end portion 204 of the sleeve 201 closing the opening 205. The cap 207 defines a series of openings 208 through with a series of conductive pins 209 extend. The pins 209 are configured to be electrically connected to the electrical cable 300 (e.g., the multi-conductor cable).

Additionally, in the illustrated embodiment, the sleeve 201 includes an enlarged portion 210 proximate to the distal end portion 204 of the sleeve 201 (e.g., a portion of the sleeve 201 proximate to the distal end portion 204 has a larger outer diameter than a portion of the sleeve 201 proximate to the proximal end portion 203 of the sleeve 201). Together, the enlarged portion 210 of the sleeve 201, the cap 207, and the pins 209 define a plug configured to mate with the receptacle 402 and the sockets 404 of the female connector 400. Additionally, in the illustrated embodiment, the flange 202 is positioned along the enlarged portion 210 of the sleeve 201.

With continued reference to the embodiment illustrated in FIG. 3A, the sleeve 201 also includes a key 211 on the enlarged portion 210 of the sleeve 201 between the flange 202 and the cap 207 at the distal end portion 204. In the illustrated embodiment, the key 211 is an arcuate projection extending circumferentially along a portion of the enlarged portion 210 of the sleeve 201. The key 211 is configured to extend into the keyway 411 in the receptacle 402 of the female connector 400 to ensure proper orientation of the male connector 200 relative to the female connector 400 such that the pins 209 are received in the corresponding sockets 404 in the female connector 400 (e.g., the engagement between the key 211 and the keyway 411 is configured to prevent connecting the male and female connectors 200, 400 together except when the male and female connectors 200, 400 are in the correct orientation relative to each other). In one or more embodiments, the key 211 may have any other suitable configuration, such as, for instance, a flat segment on the outer surface of the enlarged portion 210.

With continued reference to the embodiment illustrated in FIGS. 3A-3B, the flange 202 includes a base plate 212, an outer skirt 213 extending around an outer periphery of the base plate 212, and an inner skirt 214 spaced inwardly apart from the outer skirt 213. The inner skirt 214 is positioned between the outer skirt 213 and the enlarged portion 210 of the sleeve 201. A groove or channel 215 is defined between the outer and inner skirts 213, 214. In the illustrated embodiment, the outer skirt 213 extends completely and continuously around the outer periphery of the base plate 212 (e.g., the outer skirt 213 forms a continuous and closed track). Additionally, in the illustrated embodiment, the inner skirt 214 traces a continuous and closed path around the enlarged portion 210 of the sleeve 201 (e.g., there are no openings in the inner skirt 214).

In the illustrated embodiment, the base plate 212 includes an outer surface 216 facing away from the pins 209 (e.g., an outer surface 216 facing away from the female connector 400 when the male and female connectors 200, 400 are connected together) and an inner surface 217 opposite the outer surface 216 facing toward the pins 209 (e.g., an inner surface 217 facing toward the female connector 400 when the male and female connectors 200, 400 are connected together). Additionally, in the illustrated embodiment, the base plate 212 of the flange 202 is slanted relative to a longitudinal axis A of the sleeve 201, as illustrated in FIG. 3B (e.g., the base plate 212 of the flange 202 is non-orthogonal to the longitudinal axis A of the sleeve 201). In the illustrated embodiment, an imaginary axis B perpendicular to the base plate 212 is angled (i.e., not parallel) relative to the longitudinal axis A of the sleeve 201. In one or more embodiments, the base plate 212 of the flange 201 may have any other suitable orientation (e.g., the base plate 212 of the flange 201 may be orthogonal or substantially orthogonal to the longitudinal axis A of the sleeve 201).

Additionally, in the illustrated embodiment, the outer and inner skirts 213, 214 extend from the inner surface 217 of the base plate 212 in a direction away from the base plate 212 and toward the pins 209 of the male connector 200 (e.g., the outer and inner skirts 213, 214 extend in a direction toward the female connector 400 when the male and female connectors 200, 400 are connected together).

In the illustrated embodiment, the base plate 212 of the flange 202 has a generally heptagonal shape, although in one or more embodiments, the base plate 212 of the flange 202 may have any other suitable polygonal shape (e.g., rectangular) or any suitable non-polygonal shape (e.g., circular). Additionally, in the illustrated embodiment, the outer and inner skirts 213, 214 have the same outer profile shape or substantially the same outer profile shape as the base plate 212 (e.g., the outer profile shape of the outer and inner skirts 213, 214 corresponds or substantially corresponds to the outer profile shape of the base plate 212). In one or more embodiments, the outer and inner skirts 213, 214 may have any other suitable shapes. In one or more embodiments, the outer and inner skirts 213, 214 may have different outer profile shapes than each other and/or the outer and inner skirts 213, 214 may have different outer profile shapes than the base plate 212.

Figure 5A:
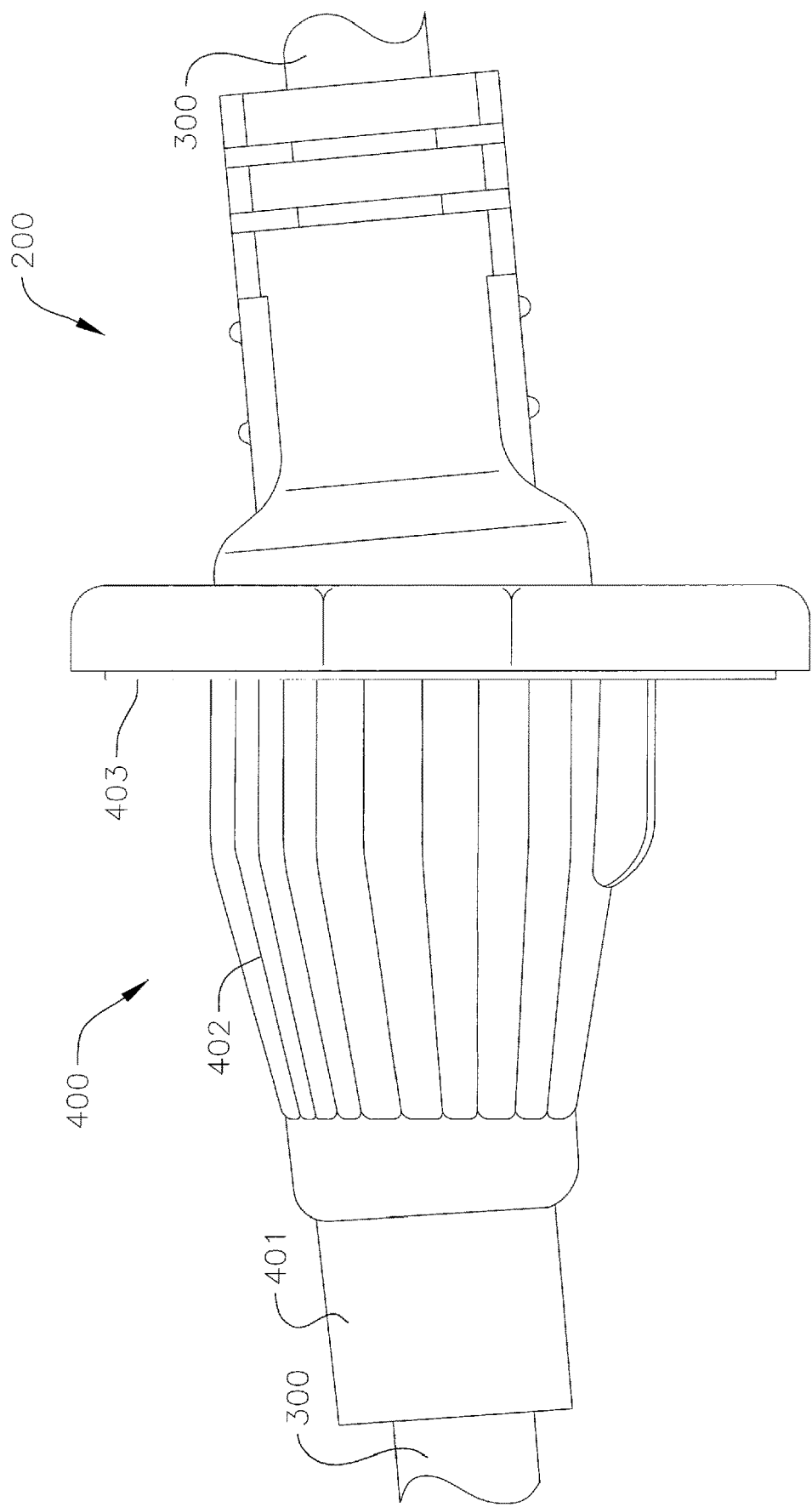
FIGS. 5A-5B are a side view and a cross-sectional view, respectively, of the male connector connected to the female connector according to one embodiment of the present disclosure.
Figure 5B:
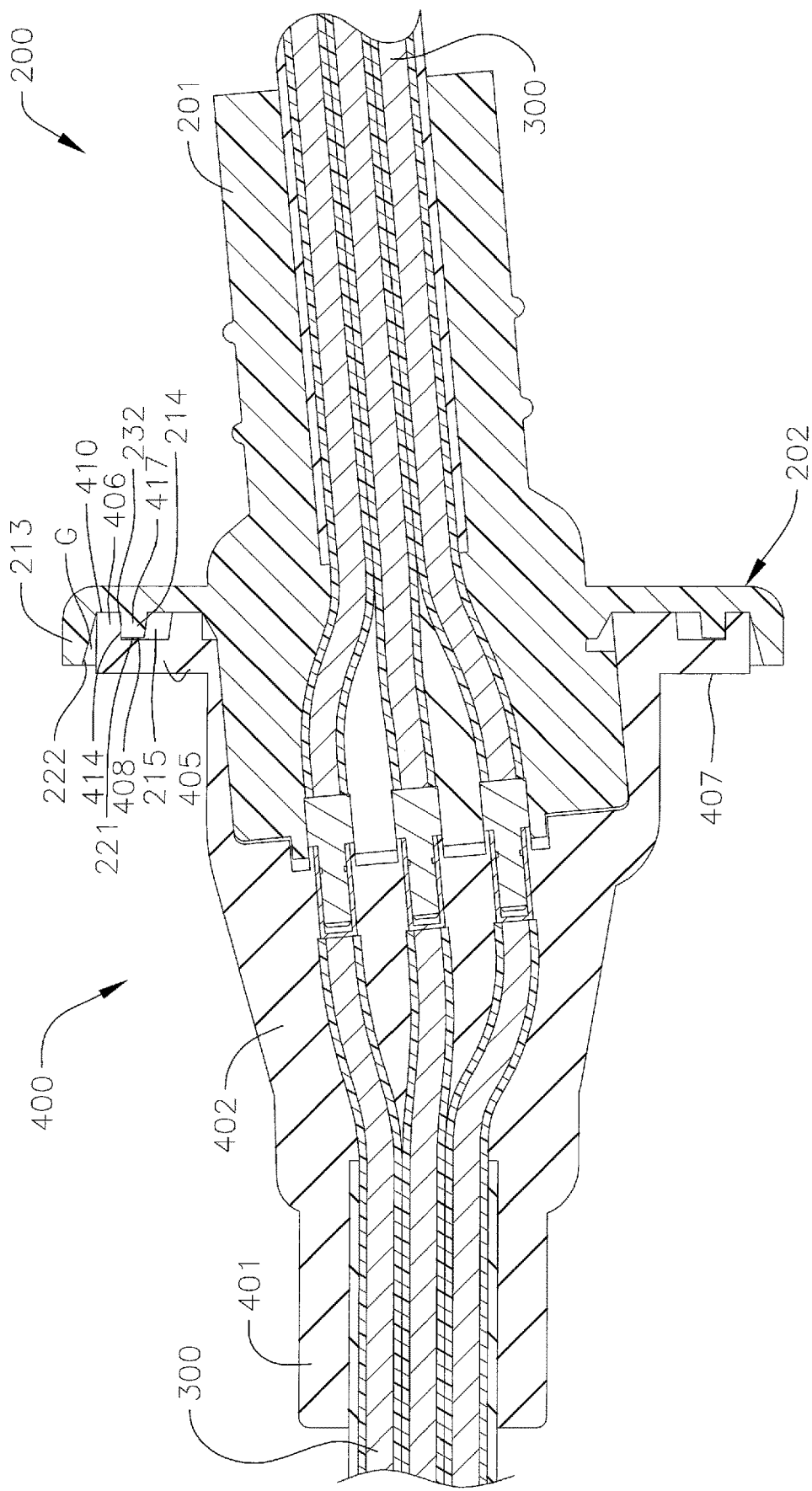

In the illustrated embodiment, the outer skirt 213 of the flange 202 has a connected end 218 at the inner surface 217 of the base plate 212 and a free end 219 opposite the connected end 218 and distal to the base plate 212. Additionally, in the illustrated embodiment, the outer skirt 213 has a height $H_{out}$ measured from the free end 219 to the connected end 218 (e.g., a height $H_{out}$ measured from the free end 219 of the outer skirt 213 to the inner surface 217 of the base plate 212). In one or more embodiments, the height $H_{out}$ of the outer skirt 213 is selected such that the free end 219 of the outer skirt 213 overlaps at least a portion of the lip 406 on the flange 403 of the female connector 400 when the male and female connectors 200, 400 are connected together, as illustrated in FIGS. 5A-5B. In one or more embodiments, the height $H_{out}$ of the outer skirt 213 is selected such that the free end 219 of the outer skirt 213 of the male connector 200 is aligned (e.g., co-planar) with the outer surface 407 of the base plate 405 of the female connector 400 when the male and female connectors 200, 400 are connected together, as described below in more detail with reference to FIGS. 5A-5B.

In the illustrated embodiment, the inner skirt 214 of the flange 202 of the male connector 200 has a connected end 220 at the inner surface 217 of the base plate 212 and a free end 221 opposite the connected end 220 and distal to the base plate 212. Additionally, in the illustrated embodiment, the inner skirt 214 has a height $H_{in}$ measured from the free end 221 to the connected end 220 (e.g., a height $H_{in}$ measured from the free end 221 of the outer skirt 213 to the inner surface 217 of the base plate 212). In the illustrated embodiment, the height $H_{out}$ of the outer skirt 213 of the male connector 200 is greater than the height $H_{in}$ of the inner skirt 214 of the male connector 200. In one or more embodiments, the outer and inner skirts 213, 214 may have any other suitable relative heights $H_{out}$, $H_{in}$. For instance, in one or more embodiments, the height $H_{out}$ of the outer skirt 213 may be the same or substantially the same as the height $H_{in}$ of the inner skirt 214.

In one or more embodiments, the height $H_{in}$ of the inner skirt 214 of the male connector 200 is equal or substantially equal to the height H of the lip 406 of the female connector 400. Accordingly, when the male and female connectors 200, 400 are mated together, as illustrated in FIGS. 5A-5B, the distal end of the lip 406 of the female connector 400 extends into the channel 215 defined between the outer and inner skirts 213, 214, and engages (e.g., contacts) the inner surface 217 of the base plate 212 between the outer and inner skirts 213, 214 (e.g., the distal end of the lip 406 of the female connector 400 contacts a portion of the inner surface 217 of the base plate 212 of the male connector 200 at the channel 215 between the outer and inner skirts 213, 214). Additionally, when the male and female connectors 200, 400 are mated together, as illustrated in FIGS. 5A-5B, the distal end 221 of the inner skirt 214 of the male connector 200 engages (e.g., contacts) the inner surface 408 of the base plate 405 of the female connector 400.

Additionally, in the illustrated embodiment, an inwardly-facing surface 222 of the outer skirt 213 (e.g., a surface of the outer skirt 213 facing the inner skirt 214) is sloped or slanted. In the illustrated embodiment, the inwardly-facing surface 222 of the outer skirt 213 tapers from a narrower end 223 at the free end 219 of the outer skirt 213 to a wider end 224 at the connected end 218 of the outer skirt 213 (e.g., a wider end 224 at the inner surface 217 of the base plate 212 and a narrower end 223 away from the inner surface 217 of the base plate 212). When the male and female connectors 200, 400 are connected together, as illustrated in FIGS. 5A-5B, an outwardly-facing surface 412 of the lip 406 of the female connector 400 is spaced apart by a gap G from the inwardly-facing surface 222 of the outer skirt 213 on the male connector 200. In one or more embodiments, the gap G between the outer skirt 213 and the lip 406 is configured to prevent water or other contaminants from wicking up between the outwardly-facing surface 412 of the lip 406 and the inwardly-facing surface 222 of the outer skirt 213.

Figure 4:
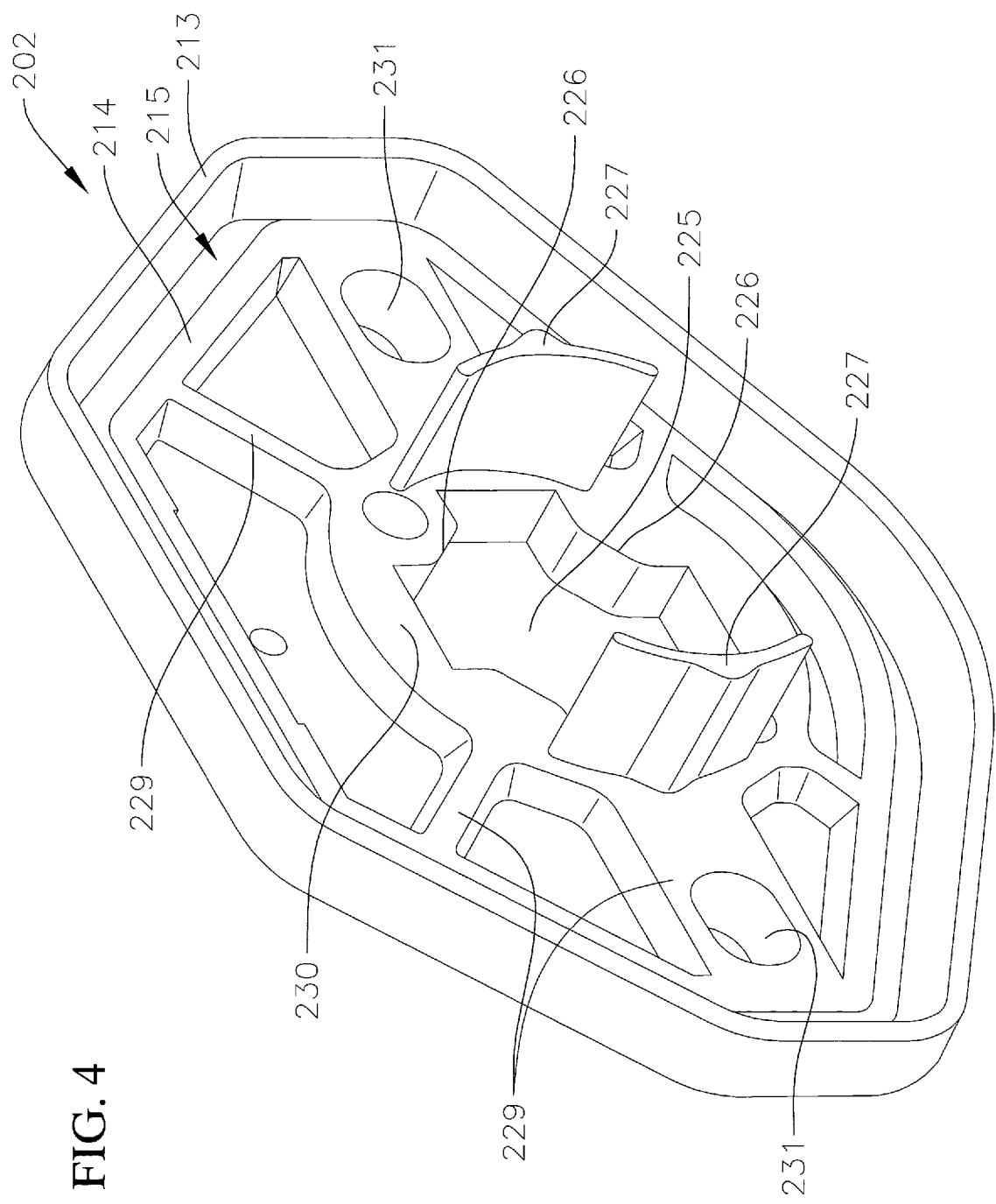
FIG. 4 is a perspective view of the embodiment of the flange illustrated in FIGS. 3A-3B.

With reference now to the embodiment illustrated in FIGS. 3A, 3B, and 4, the flange 202 and the sleeve 201 of the male connector 200 may be integrally formed as a monolithic component (e.g., the sleeve 201 may be overmolded onto the flange 202). In the illustrated embodiment, the flange 202 includes a central opening 225. In one or more embodiments, the central opening 225 in the flange 202 is sized such that the flange 202 may be slid over the electrical cable 300 and then the sleeve 201 may be overmolded onto the flange 202.

Additionally, in the illustrated embodiment, the flange 202 may include one or more nubs 226 extending into the central opening 225. In one or more embodiments, the one or more nubs 226 are configured to aid in securing the flange 202 to the sleeve 201 (e.g., during an overmolding process). Although in the illustrated embodiment the flange 202 includes four equidistantly spaced nubs 226, in one or more embodiments, the flange 202 may include any other suitable number of nubs 226 and the nubs 226 may have any other suitable arrangement around the central opening 225.

With continued reference to the embodiment illustrated in FIGS. 3A, 3B, and 4, the flange 202 also includes a pair of tabs 227 on opposite sides of the central opening 225. In the illustrated embodiment, the tabs 227 extend from the inner surface 217 of the base plate 212 in a direction away from the base plate 212 and toward the pins 209 of the male connector 200 (e.g., the tabs 227 extend in a direction toward the female connector 400 when the male and female connectors 200, 400 are connected together). In the illustrated embodiment, the tabs 227 extend in the same direction as the outer and inner skirts 213, 214. In the illustrated embodiment, the sleeve 201 is overmolded onto the tabs 227 on the flange 202 to secure the sleeve 201 to the flange 202. In the illustrated embodiment, once the sleeve 201 has been joined to the flange 202 (e.g., by overmolding), the tabs 227 on the flange 202 extend into portions 228 of the enlarged portion 210 of the sleeve 201. In this manner, the tabs 227 on the flange 202 are configured to secure the flange 202 to the sleeve 201. Although in the illustrated embodiment the flange 202 includes a pair of opposing tabs 227, in one or more embodiments the flange 202 may include any other suitable number of tabs 227 (e.g., a single tab or more than two tabs) and the one or more tabs 227 may have any other suitable arrangement around the central opening 225 in the flange 202.

With continued reference to the embodiment illustrated in FIG. 3A-4, the flange 202 of the male connector 200 also includes a series of ribs 229 on the inner surface 217 of the base plate 212 extending inward (e.g., radially inward) from the inner skirt 214. The ribs 229 are configured to support and strengthen the inner skirt 214. Additionally, in the illustrated embodiment, the flange 202 of the male connector 200 also includes an embossed portion 230 around the central opening 225. The embossed portion 230 is configured to strengthen the flange 202 around the central opening 225. In the illustrated embodiment, the ribs 229 extend along the inner surface 217 of the base plate 212 from the inner skirt 214 to the embossed portion 230 (e.g., the ribs 229 extend radially inward from the inner skirt 214 to the embossed portion 230).

In operation, when the male and female connectors 200, 400 are mated together, as illustrated in FIGS. 5A-5B, the lip 406 of the female connector 400 extends into the channel 215 defined between the outer and inner skirts 213, 214 of the male connector 200 and the free end 410 of the lip 406 contacts the inner surface 217 of the base plate 212 in the channel 215. Accordingly, the outer and inner skirts 213, 214 of the male connector and the lip 406 of the female connector 400 are intermeshed when the male and female connectors 200, 400 are mated together. Additionally, in the illustrated embodiment, when the male and female connectors 200, 400 are mated together, an outwardly-facing surface 232 of the inner skirt 214 (e.g., a surface 232 of the inner skirt 214 facing the outer skirt 213) of the male connector 200 contacts (e.g., is pressed against) an inwardly-facing surface 414 of the lip 406 of the female connector 400. Further, when the male and female connectors 200, 400 are mated together, the free end 221 of the inner skirt 214 of the male connector 200 contacts the inner surface 408 of the base plate 405 of the female connector 400. Together, the outer and inner skirts 213, 214 on the flange 202 of the male connector 200 and the lip 406 on the female connector 400 define a seal (e.g., a seal formed along a tortuous or serpentine path) configured to prevent water and/or other contaminants from reaching the pins 209 and/or sockets 404 of the electrical connectors 200, 400. In this manner, the configuration of the outer and inner skirts 213, 214 of the male connector 200 and the lip 406 of the female connector 400 is configured to prevent or at least mitigate against corrosion and/or degradation of the electrical connectors 200, 400 and the electrical cable 300.

Additionally, in one or more embodiments, the base plate 212 of the male connector 200 includes at least one opening 231 and the base plate 405 of the female connector 400 includes at least one opening 413 configured to align with the opening 231 in the male connector 200 when the male and female connectors 200, 400 are mated together, as illustrated in FIGS. 5A-5B. In the illustrated embodiment, the base plates 212, 405 include at least one pair of aligned openings 231, 413, respectively, although in one or more embodiments, the base plates 212, 405 may have any other suitable number of openings 231, 413. The openings 231, 413 in the base plates 212, 405 are configured to receive one or more fasteners securing the male and female connectors 200, 400 together in the mated position. Additionally, in one or more embodiments, the fasteners extending through the openings 231, 413 in the base plates 212, 405 are configured to draw the base plates 212, 405 toward each other. Drawing the base plates 212, 405 of the male and female connectors 200, 400 toward each other is configured to ensure contact between the free end 221 of the inner skirt 214 of the male connector 200 and the inner surface 408 of the base plate 405 of the female connector 400. Drawing the base plates 212, 405 of the male and female connectors 200, 400 toward each other is also configured to ensure that the lip 406 of the female connector 400 extends into the channel 215 defined between the outer and inner skirts 213, 214 of the male connector 200 and the free end 410 of the lip 406 contacts the inner surface 217 of the base plate 212 in the channel 215. Such contact is configured to prevent or mitigate the intrusion of water or other contaminants.

When the male and female connectors 200, 400 are connected together, they may be mounted in any desired orientation (e.g., horizontal or vertical). In one or more embodiments, the configurations of the flanges 202, 403 of the male and female connectors 200, 400, respectively, are configured to prevent or at least mitigate the risk of the intrusion of contaminants regardless of the orientation in which the male and female connectors 200, 400 are connected together. For instance, in one or more embodiments in which the male and female connectors 200, 400 are connected together in a vertical orientation, the male connector 200 may be positioned above the female connector 400 such that the outer skirt 213 of the male connector 200 functions as a cover or an umbrella shielding the flange 403 of the female connector 400 and thereby mitigating the risk of contaminant intrusion. In one or more embodiments in which the male and female connectors 200, 400 are connected together in a horizontal orientation, the outer skirt 213 of the male connector 200 extends around the lip 406 on the flange 403 of the female connector 400. Additionally, in any mounting orientation, the free end 221 of the inner skirt 214 of the male connector 200 contacts the inner surface 408 of the base plate 405 of the female connector 400, the lip 406 of the female connector 400 extends into the channel 215 defined between the outer and inner skirts 213, 214 of the male connector 200, and the free end 410 of the lip 406 contacts the inner surface 217 of the base plate 212 in the channel 215 to mitigate the risk of contaminant intrusion.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. For instance, in one or more embodiments, the configuration of the flange 202 of the male connector 200 and the configuration of the flange 403 of the female connector 400 may be switched (e.g., the flange 403 of the female connector 400 may include the outer and inner skirts 213, 214 and the flange 202 of the male connector 200 may include the lip 406).

Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is referred to as being "coupled" to another component, it can be directly attached to the other component or intervening components may be present therebetween.

What is claimed is:

1. A connector configured to be connected to an electrical cable, the connector comprising:
    a sleeve configured to extend around an end of the electrical cable; and
    a flange extending outward from the sleeve, the flange comprising:
        a base plate having an outer surface and an inner surface;
        an outer skirt extending continuously and completely around an outer periphery of the base plate;
        an inner skirt on the base plate spaced apart from the outer skirt, the inner skirt tracing a closed and continuous path around the sleeve; and
        a channel defined between the inner and outer skirts.

2. The connector of claim 1, wherein the outer skirt has a first height and the inner skirt has a second height less than the first height.

3. The connector of claim 1, wherein the flange is slanted relative to a longitudinal axis of the sleeve.

4. The connector of claim 1, wherein the connector is a male connector comprising a plurality of pins.

5. The connector of claim 1, wherein the connector is a female connector comprising a plurality of sockets.

6. The connector of claim 1, wherein the inner and outer skirts are substantially perpendicular to the inner surface of the base plate.

7. The connector of claim 1, wherein the inner skirt has a generally square cross-sectional shape.

8. The connector of claim 1, wherein the outer skirt comprises a tapered surface facing the inner skirt.

9. The connector of claim 1, wherein the sleeve and the flange are monolithic.

10. An electrical cable assembly, comprising:
    an electrical cable;
    a first connector connected to a first end of the electrical cable, the first connector comprising:
        a sleeve extending around the first end of the electrical cable;
        a plurality of pins extending from an end of the sleeve; and
        a flange extending outward from the sleeve, the flange comprising:
            a base plate having an outer surface and an inner surface;
            an outer skirt extending continuously and completely around an outer periphery of the base plate;
            an inner skirt on the base plate spaced apart from the outer skirt, the inner skirt tracing a closed and continuous path; and
            a channel defined between the inner and outer skirts; and
    a second connector configured to mate with the first connector, the second connector comprising:
        a receptacle comprising a plurality of sockets;
        a flange extending outward from the receptacle, the flange comprising a base plate having an inner surface and an outer surface, and a lip extending around a periphery of the base plate.

11. The electrical cable assembly of claim 10, wherein a height of the lip of the second connector is substantially equal to a height of the inner skirt of the first connector.

12. The electrical cable assembly of claim 11, wherein a height of the outer skirt is greater than the height of the inner skirt.

13. The electrical cable assembly of claim 10, wherein, when the first and second connectors are connected together, the lip of the second connector extends into the channel in the first connector between the inner and outer skirts.

14. The electrical cable assembly of claim 10, wherein, when the first and second connectors are connected together, a free end of the lip of the second connector contacts the inner surface of the base plate of the first connector.

15. The electrical cable assembly of claim 10, wherein, when the first and second connectors are connected together, a free end of the inner skirt of the first connector contacts the inner surface of the base plate of the second connector.

16. The electrical cable assembly of claim 10, wherein, when the first and second connectors are connected together, the outer skirt of the first connector overlaps at least a portion of the lip of the second connector.

17. The electrical cable assembly of claim 16, wherein, when the first and second connectors are connected together, a free end of the outer skirt of the first connector is aligned with the outer surface of the base plate of the second connector.

18. The electrical cable assembly of claim 10, wherein, when the first and second connectors are connected together, an outwardly-facing surface of the inner skirt of the first connector contacts an inwardly-facing surface of the lip of the second connector.

19. The electrical cable assembly of claim 16, wherein the base plates of the first and second connectors comprise at least one pair of aligned openings configured to receive a fastener drawing the base plates together.

* * * * *